United States Patent
Zhou et al.

(10) Patent No.: US 8,193,795 B2
(45) Date of Patent: Jun. 5, 2012

(54) OUTPUT CURRENT AND INPUT POWER REGULATION WITH A POWER CONVERTER

(75) Inventors: Dongsheng Zhou, San Jose, CA (US); Kent Kernahan, Cupertino, CA (US); Milton D. Ribeiro, Los Altos, CA (US)

(73) Assignee: Exar, Inc., Fremont, CA (US)

( * ) Notice: Subject to any disclaimer, the term of this patent is extended or adjusted under 35 U.S.C. 154(b) by 1814 days.

(21) Appl. No.: 11/253,001

(22) Filed: Oct. 17, 2005

(65) Prior Publication Data
US 2006/0145670 A1 Jul. 6, 2006

Related U.S. Application Data

(60) Provisional application No. 60/641,919, filed on Jan. 5, 2005.

(51) Int. Cl.
G05F 1/00 (2006.01)
(52) U.S. Cl. .................................................. 323/283
(58) Field of Classification Search .......... 323/282–284, 323/222–224; 315/291
See application file for complete search history.

(56) References Cited

U.S. PATENT DOCUMENTS

| | | | |
|---|---|---|---|
| 6,115,726 A * | 9/2000 | Ignjatovic | 708/300 |
| 6,618,031 B1 | 9/2003 | Bohn, Jr. et al. | |
| 6,825,644 B2 | 11/2004 | Kernahan et al. | |
| 2004/0135560 A1* | 7/2004 | Kernahan et al. | 323/282 |
| 2004/0150380 A1* | 8/2004 | Santin et al. | 323/283 |

OTHER PUBLICATIONS

TPS61060 TPS61061 TPS61062 Constant Current LED Driver With Digital and PWM Brightness Control (Texas Instruments Incorporated, Nov. 2004).
"DC-DC Converters: A Primer" Electus Distribution Reference Data Sheet, 2001.
Curtis, Keith, "Buck Configuration High-Power LED Driver" Microchip AN874, Microchip Technology Inc. 2003, pp. 1-16.
Maresca, Pat "Negative Bias Output DC-to-DC Converters for Battery Operated Systems: Inductorless Boost/Buck Regulator or Switcher?—An Inductorless Regulator May Be a Better Solution in Certain Applications." Telcom Semiconductor, Inc. 1998.
"Understanding LEDs in Lighting and Displays" AIA/CES Series Sponsored This Issue by BARCO, pp. 1-8.

* cited by examiner

*Primary Examiner* — Jue Zhang
(74) *Attorney, Agent, or Firm* — Michael W. Caldwell

(57) ABSTRACT

A power converter circuit senses the output voltage (Vo) and controls the converter's duty cycle (d1) to provide a steady output current (Io) or input power (Pin) in each switching cycle (T). During an initial period (Tramp), the controller provides a possibly smaller target current (Iramp) to reduce the system stress while the output voltage rises to a suitable value (InitVtar).

9 Claims, 3 Drawing Sheets

OUTPUT CURRENT AND INPUT POWER REGULATION WITH A POWER CONVERTER

CROSS REFERENCE TO RELATED APPLICATIONS

The present application claims priority of U.S. provisional application No. 60/641,919, filed on Jan. 5, 2005. The provisional application is incorporated herein by reference in its entirety, including its computer program listing appendix.

This application is related to U.S. patent application Ser. No. 10/295,739 filed on Nov. 14, 2002, by Kent Kernahan and John Carl Thomas, entitled "Switching Power Converter", now U.S. Pat. No. 6,825,644 issued Nov. 30, 2004 which is incorporated herein by reference.

BACKGROUND OF THE INVENTION

This invention relates to switching power supplies or converters. Some embodiments use a switching power converter in a constant current or constant power mode.

Efficient and effective backlighting of displays is important for personal digital assistant computers (PDAs) and other portable computers, cell phones, cordless phones, handheld game devices, and the like. White light emitting diodes (LEDs) are popular for backlighting, but must be white as perceived by the human eye to enable color graphics, such as pictures, to be the correct color. LEDs of other colors may also require a certain power input for a specified color. In addition, many products require the ability to dim the display in response to ambient light, product mode (e.g. sleep, run, play a movie, etc.), user preference and the like. In some applications multiple LEDs are needed to uniformly illuminate a large display.

The color of some LEDs is affected by the current with which they are driven. For example, white LEDs actually emit a mix of blue and yellow wavelengths which human eyes perceive as white. The mix of the two wavelengths is affected by the current through the LED and the power delivered to the LED.

The current driver can be implemented as a switching power converter having an output terminal connected to the LEDs. The power converter keeps the voltage on the output terminal at a pre-calculated constant target value corresponding to the desired current. This voltage regulation to provide current control is not fully satisfactory however because the current through the LEDs can drift at a constant voltage due to heating of the LEDs, age, and possibly other conditions.

FIG. 1 shows a driver circuit that senses the LED current rather than output voltage. This is a buck converter circuit, described in "AN874 Buck Configuration High-Power LED Driver" (Microchip Technology Inc. 2003). Input voltage Vbatt is connected to one terminal of a PMOS switch 104 whose other terminal 110 is connected to induction coil L1. The other terminal of coil L1 is the driver circuit's output terminal 120, connected to the anode of LED 130. The LED's cathode is connected to resistor R8 whose other terminal is grounded. The LED's cathode is also connected to one terminal of feedback current sensing resistor R6. The other terminal 140 of resistor R6 is connected to the non-inverting input of operational amplifier 150. The inverting input of amplifier 150 receives a voltage Vdrive. The amplifier's output is connected to the gate of transistor 104. A smoothing capacitor C3 and a diode D are also part of the circuit. Amplifier 150 turns the switch 104 on or off depending on the current through LED 130.

SUMMARY

This section summarizes some features of the invention. Other features are described in the subsequent sections. The invention is defined by the appended claims which are incorporated into this section by reference.

Some embodiments of the present invention provide for one or more LEDs to be driven such that a steady light of the desired color and intensity is attained with good efficiency. Some embodiments regulate the current without sensing the LED current (i.e. using an open loop scheme). The driver circuit senses the output voltage and controls the converter's duty cycle to provide a steady current to the output terminal in each switching cycle.

While the driver senses the output voltage, the driver does not attempt to keep the output voltage constant. If the output voltage increases, the driver does not decrease the output current but keeps the output current constant. Similarly, if the output voltage decreases, the driver holds the output current constant. The output voltage is sampled simply to determine the converter's duty cycle needed to provide the constant output current.

In some embodiments, the driver circuit provides constant power to the driver circuit's output terminal in each switching cycle. The converter samples the output voltage but does not sample the power flowing through the LEDs.

In some embodiments, the driver circuit provides a controlled ramp-up mode when the circuit is first turned on, to enable a controlled increase in the LEDs' lighting intensity. The controlled ramp-up is desired to reduce the stress on the system and the user's eyes.

The invention is not limited to the features and advantages described above. The invention is not limited to white LEDs or to any LEDs or flat panel displays, and includes non-LED current or power regulators. Other features are described below. The invention is defined by the appended claims.

DESCRIPTION OF SOME EMBODIMENTS

The embodiments described in this section illustrate but do not limit the invention. The invention is not limited to particular circuitry, software, voltage and current values, or other parameters. The invention is defined by the appended claims.

Figure 2:
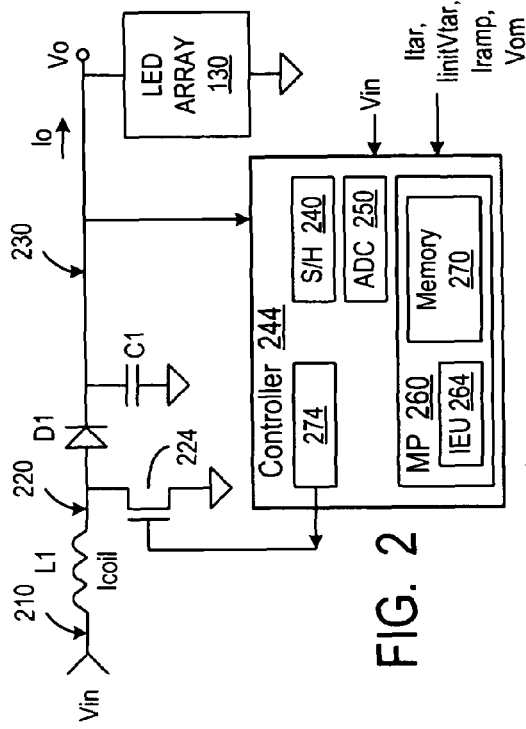
FIG. 2 is a block-circuit diagram of a constant current or constant power regulator according to some embodiments of the present invention.

FIG. 2 is a block-circuit diagram of a boost converter driver driving a LED array 130. An input voltage Vin is provided on a node 210 to one terminal of a coil L1. The coil's other terminal 220 is connected to the drain of an NMOS switch 224 whose source is grounded (or connected to some other reference voltage). Terminal 220 is also connected to the anode of diode D1. The diode's cathode node 230 provides the output voltage Vo to LED array 130. Node 230 is connected to one plate of an optional smoothing capacitor C1 whose other plate is grounded (or at some other reference voltage).

The voltage Vo on node 230 is sampled by a sample and hold (S/H) circuit 240 in controller 244 each switching period T (1.9 μs in some embodiments). The sampled voltage is digitized by analog to digital converter (ADC) 250. Input voltage Vin is also sampled each cycle T and digitized by the same or different sample and hold and ADC circuits in controller 244. The digitized voltages Vo, Vin are processed by microprocessor 260 (comprising an instruction execution unit 264 and a memory 270) to calculate the on and off times for switch 224 for each switching cycle T. (The on time is shown as t1 in FIG. 3 described below; the off time is t2+t3.) The calculated on and off times are provided to switch driver 274 to generate the signal SSET on the gate of transistor 224. Instruction execution unit 264 in processor 260 executes software instructions stored in memory 270. The software can be in the form of firmware or any other form. The digital values for Vo, Vin, and other parameters used by processor 260 are stored in memory 270. Memory 270 can be static random access memory (SRAM) or any other kind of memory known or to be invented. The invention is not limited to a particular architecture of processor 260.

Figure 3:
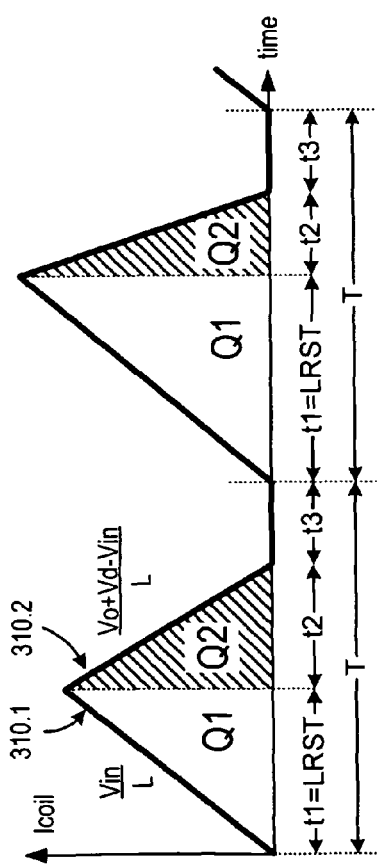
FIG. 3 is a graph of a coil current versus time in some embodiments of the present invention.

FIG. 3 is a diagram of the coil current Icoil through coil L1 versus time in the normal operating mode (as opposed to a ramp-up starting mode described below). In each switching cycle T, transistor 224 is on for a time t1 (also denoted LRST), allowing the current to ramp up to a peak value, as shown by line 310.1. Then the transistor turns off, and the coil current flows into the output terminal Vo (line 310.2). The current becomes zero some time before the end of the switching cycle (i.e. this is discontinuous current mode (DCM)). The time period during which the current decreases to zero is denoted t2. The time from the end of t2 to the end of the switching cycle is shown as t3. Icoil=0 during t3. The converter duty cycle d1 (the switch 224 duty cycle) is t1/T by definition.

The time t1 is computed by processor 260 to provide a constant average current Io to terminal Vo. Io is defined as the charge provided to the Vo terminal 230 in one switching cycle T divided by T. Thus, Io is kept at a target value "Itar" specified by the system designer and provided to controller 244.

The time t1 is computed as follows. Since the coil current flows to terminal Vo only during the time t2, the charge provided to the Vo terminal in one switching cycle is the area Q2 under the line 310.2. This line has a slope −DV/L, where: DV is the EMF (electromotive force) of the coil L1 during the time t2, i.e.

$$DV = Vo + Vd - Vin \quad (1)$$

Vd is the voltage drop across the diode D1;
L is the inductance of coil L1.
Of note, DV is positive since this is a boost converter. The area Q2 is thus:

$$Q2 = \frac{1}{2} * DV/L * (t2)^2$$

Therefore, ignoring converter efficiency for now:

$$Io = \frac{DV}{2TL}(t2)^2 \quad (2)$$

The time t2 can be expressed in terms of t1 from the condition that the peak coil current is provided both at the end of t1 and at the start of t2:

$$(Vin/L)*t1 = (DV/L)*t2, \text{ and hence} \quad (3)$$

$$t2 = (Vin/DV)*t1 \quad (4)$$

Therefore, $$Io = \frac{Vin^2}{2TL*DV}(t1)^2 \quad (5)$$

Hence, $$t1 = \frac{\sqrt{2L*Io*DV*T}}{Vin} \quad (6)$$

$$= \frac{\sqrt{2L*Io*(Vo+Vd-Vin)*T}}{Vin}$$

and the duty cycle $$d1 = \frac{\sqrt{2L*Io*(Vo+Vd-Vin)}}{Vin\sqrt{T}} \quad (7)$$

For Io = Itar, we obtain:

$$t1 = \frac{\sqrt{2L*Itar*(Vo+Vd-Vin)*T}}{Vin} \quad (8)$$

and the duty cycle $$d1 = \frac{\sqrt{2L*Itar*(Vo+Vd-Vin)}}{Vin\sqrt{T}} \quad (9)$$

In each period T, controller 244 turns on the transistor 224 for the time t1 computed according to (8) and turns off the transistor 224 for the rest of the T period.

To ensure the discontinuous current mode, the inductance L is chosen to so that the Itar value does not exceed the critical current Icrit defined as the output current Io in the critical current mode. Icrit can be found from the condition t3=0 (i.e. t1+t2=T) and equations (1), (4) and (5). In the critical condition (see equation (4)), $$t1 = \frac{T*DV}{(Vo+Vd)} \quad (10)$$

and therefore (equation (5))

$$Icrit = \frac{Vin^2 * T * (Vo + Vd - Vin)}{2L*(Vo+Vd)^2} \quad (11)$$

If Vd is negligible, we can write:

$$Icrit = \frac{Vin^2 * T}{2L*Vo}\left(1 - \frac{Vin}{Vo}\right) \quad (12)$$

From equation (10), and taking into account the converter efficiency ($\eta$), the following expression can be derived:

$$Icrit = \frac{\eta T * Vin^2 * (Vo+Vd-Vin)}{2L*(Vo+Vd)^2} \cong \frac{\eta T * Vin^2 * \left(1 - \frac{Vin}{Vo} + \frac{Vd}{Vo}\right)}{2L*Vo} \quad (13)$$

where the converter efficiency η is defined as:

$$\eta = \frac{Vo * Io}{Vin * Iin} \quad (14)$$

and Iin is the average input current in one T period. Generally in DCM (note equation (4)), $$Iin = (Q1 + Q2)/T = \frac{Vin}{2TL}\left(1 + \frac{Vin}{DV}\right)t1^2 = \frac{Vin * d1^2 * T(Vo + Vd)}{2L(Vo + Vd - Vin)} \quad (15)$$

Here the charge Q1 is the area under the line 310.1 (FIG. 3). In the critical condition (see equation (10)), $$Iin = \frac{T * Vin * (Vo + Vd - Vin)}{2L * (Vo + Vd)} \quad (16)$$

In some embodiments, the efficiency η is not measured during the operation but is estimated in advance by the designer. The Itar value can be increased (for equation (9), for example, and other equations) to take into account the estimated efficiency value. The L selection to ensure DCM is described in more detail below.

In some embodiments, the constant current control as described above is enabled in response to the user turning on the display or in response to an enable signal (not shown) provided to controller 244. Controller 244 may use other control methods when the enable signal is deasserted. When the constant current control is first enabled, the output voltage Vo may have to be increased from 0 or some other value to an appropriate value InitVtar for the current control mode (see FIG. 4). For example, InitVtar should be above Vin for the normal boost converter operation. It is desirable to increase Vo at a controlled rate to reduce the stress on the system and the user's eyes. Because of parasitic effects, temperature and other factors, the exact output voltage Vo upon reaching the target current Itar is not known ahead of time. During ramp up (shown as the period from time 0 to a time Tramp in FIG. 4) controller 244 monitors Vo and compares it to the value InitVtar provided by the system designer. The time Tramp (FIG. 4) is defined as the time when Vo reaches InitVtar. The normal operation described above (determining t1 from equation (6) with Io=Itar)) begins at time Tramp. Tramp can be many times larger than T. The controlled ramp up is achieved by keeping the output current Io at or below a predefined value Iramp specified by the designer. The value Iramp is provided to controller 244. (The value InitVtar provided by the designer can be stored in a memory location in memory 270, and can later be overwritten with a Vo value obtained after the time Tramp, so that if the converter is turned off and then back on again, the converter will use that Vo value instead of the InitVtar value.)

Figure 4:
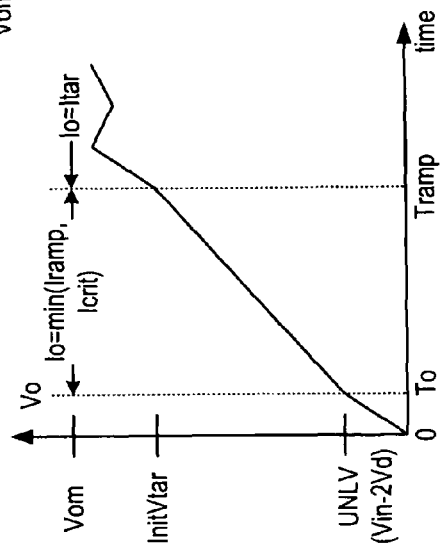
FIG. 4 is a chart of the output voltage versus time in some embodiments of the present invention.
Figure 1:
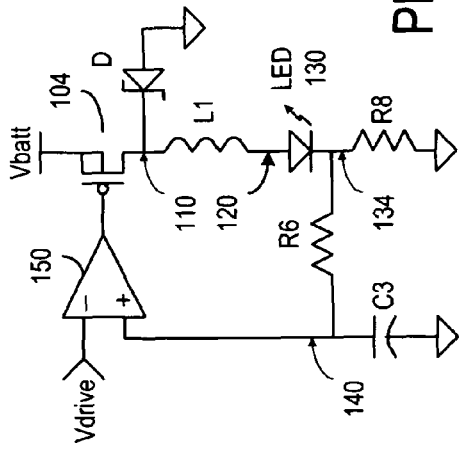
FIG. 1 is a circuit diagram of a prior art LED driver.
Figures 5, 6:
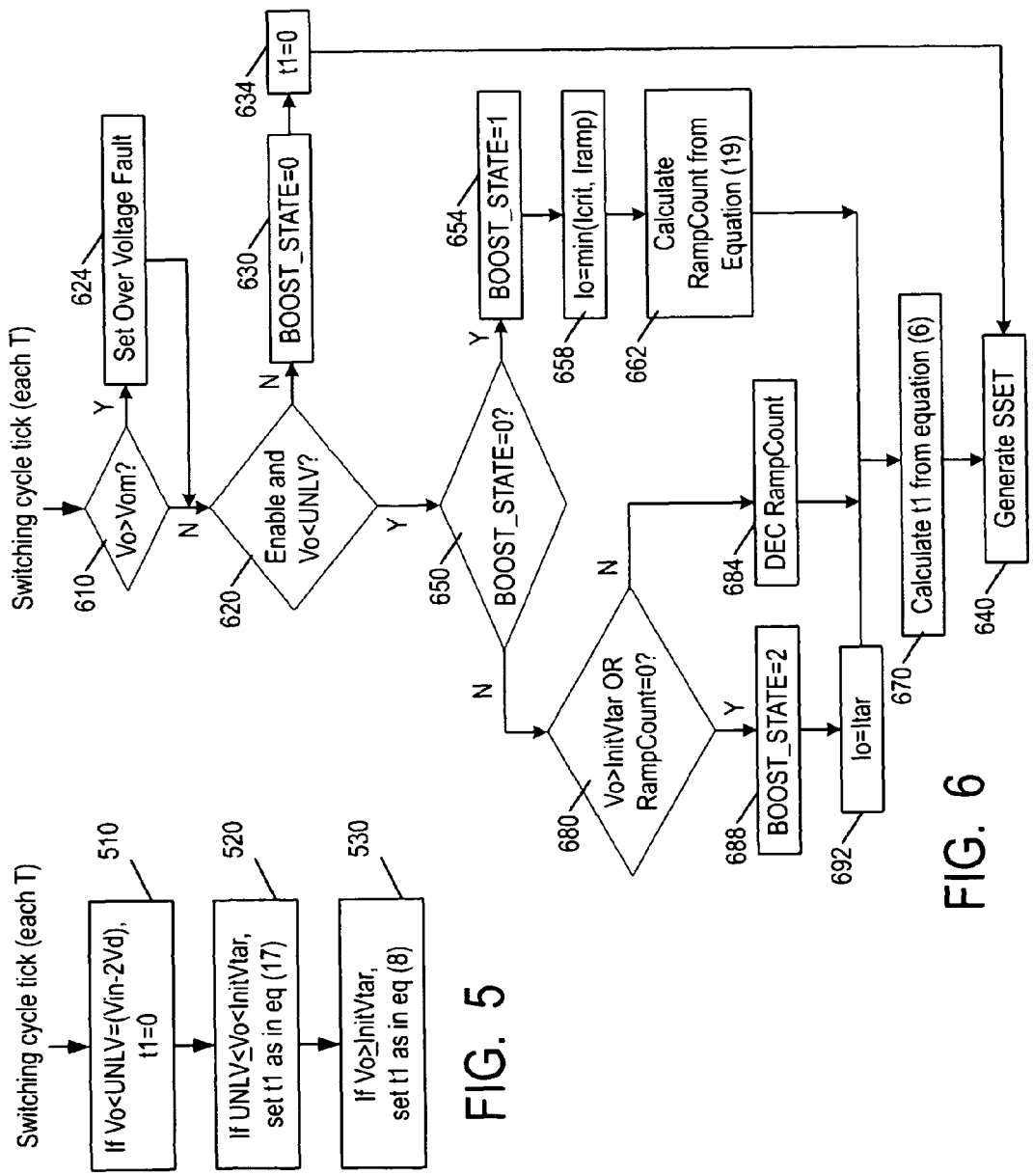
FIGS. 5-7 are flow charts of duty cycle calculations in some embodiments of the present invention.

One embodiment is illustrated in FIG. 5. This is a flowchart of a program executed by processor 260. The voltages Vo, Vin are sampled every T period. As long as Vo is less than a value UNLV=Vin−2Vd (step 510), microprocessor 260 sets t1=0. Hence the switch 224 is kept off, allowing the voltage Vo to quickly increase towards the value Vin. The time when Vo reaches UNLV is shown as To in FIG. 4. Starting at To (step 520), processor 260 sets t1 as follows (use equation (6) with Io=min(Iramp, Icrit)):

$$t1 = \frac{\sqrt{2L * ItarRamp * (InitVtar + Vd - Vin) * T}}{Vin} \quad (17)$$

where $$ItarRamp = \min(Iramp, Icrit). \quad (18)$$

Equation (17) can be derived from equation (6) if Io is replaced with ItarRamp and Vo is replaced with InitVtar. Icrit is determined from equation (11) or (13) for some hypothetical Vo and η values chosen by the designer to ensure that the calculated Icrit does not exceed the actual Icrit value for the actual Vo and η ranges obtained. In some embodiments, the Vo value is InitVtar and the η value is about 85%. In some embodiments, the value Iramp, and hence ItarRamp, is less than Itar.

When Vo reaches InitVtar (a value greater than Vin), then t1 is calculated using equation (8), as shown at 530.

In some embodiments, Vin is 2.5~5.5 V. Vo is 5.0~30 V in normal operation (after Tramp). Vd=1.0 V; T=1.9 μs; InitVtar=12 V; Itar=20 mA; Iramp=15 mA; L=2 μH; C=1 μF. This values are exemplary and not limiting.

In some embodiments, the operation from To to Tramp takes place for at most a preset number RampCount of the T periods. If the LED current is negligible at this time, the output current Io simply charges the capacitor C1. Therefore, RampCount is calculated as:

$$RampCount = \frac{C(InitVtar - Vo)}{ItarRamp * T} \quad (19)$$

where C is the capacitance of C1.

FIG. 6 shows a flow chart of a program executed by microprocessor 260 in each switching cycle to determine t1 for the next switching cycle in one such embodiment. At step 610, Vo is compared to a preset maximum value Vom provided to controller 244. Vom=16 V in one embodiment. If Vo is not greater than Vom, then we go to step 620. If Vo is greater than Vom then we set an over-voltage fault flag (step 624) before going to step 620. The over-voltage fault flag can be used to provide an alarm signal to a designer or the system user. At step 620 we test for two conditions. If the constant current algorithm has not been enabled or Vo is less than UNLV, then a state variable BOOST_STATE keeping track of the state of the circuit is set to 0 (step 630), and t1 is set to 0 (step 634). Hence the signal SSET stays low (step 640) for the entire switching cycle, and switch 224 remains off. This operation occurs up to time To (FIG. 4). Of note, step 640 is performed by driver 274 which may or may not be part of processor 260.

If the constant current algorithm has been enabled and Vo is greater than or equal to UNLV, then we compare BOOST_STATE to 0 (step 650). BOOST_STATE=0 means that the calculation of Io, Vo, RampCount has not been performed for the ramp up. In this case, BOOST_STATE is set to 1 (step 654). At step 658, Icrit is calculated from the equation (13) by setting Vo=InitVtar. Io is thus set to ItarRamp (equation (18)). At step 662, RampCount is calculated from equation (19). Step 670 performs the t1 calculation using equation (6), with the Io value provided at step 658 and with the sampled Vo value. At step 640, the signal SSET is generated based on this t1 value.

If at step 650 BOOST_STATE is not zero (indicating that Io and RampCount have already been calculated for the ramp up), then two comparisons are made at step 680. If Vo is not greater than InitVtar and RampCount is not zero, then Ramp- Count is decremented (step 684) and control passes to step 670 to calculate t1 from equation (6). Here Io=ItarRamp (calculated at step 658). If at step 680, Vo is greater than InitVtar or RampCount is zero, then BOOST_STATE is set to 2 at step 688 (meaning that the ramp up mode should be terminated), Io is set to Itar (step 692), and control passes to step 670.

To ensure the DCM operation, the coil L1 is sized so that the target current Itar would be less than Icrit (equation (13)). This means:

$$L < \frac{\eta T * Vin^2 * (Vo + Vd - Vin)}{2Itar * (Vo + Vd)^2} \quad (20)$$

In DCM, the coil current Icoil may ring when it returns to zero. In some embodiments, to make it less likely that a T period may start during the ringing, the coil is chosen so that Itar would be at most 25% of Icrit, and hence:

$$L \leq \frac{\eta T * Vin^2 * (Vo + Vd - Vin)}{8Itar * (Vo + Vd)^2} \quad (21)$$

A suitable L value can be chosen by setting Vo and η to appropriate values to provide suitable operation for an expected range of the Vo and η parameters. In some embodiments, η=85% and Vo=12 V.

The capacitance C of C1 is determined as follows. We assume that t2 is small compared to (t1+t3). Therefore, we can model the effect of the equivalent series resistance (ESR) of capacitor C1 is a voltage jump ΔV=(Itar*ESR) in normal operation. Since the converter delivers power to the output Vo only during the time t2, the voltage ripple ΔVo due to the capacitance is:

$$\Delta Vo = Itar*(t1+t3)/C = Itar*(d1+d3)*T/C \quad (22)$$

where d3=t3/T. The total voltage effect of the capacitor is ΔV+ΔVo. Therefore, we get:

$$\Delta Vlimit > Itar*(t1+t3)*/C + Itar*ESR \quad (23)$$

where ΔVlimit is the upper limit allowed by the designer for the output ripple voltage caused by capacitor C1 (ΔVlimit=20 mV in some embodiments). Noting that t1+t3=T−t2 and using the equations (4) and (8), we obtain:

$$C \geq \frac{Itar*T}{\Delta Vlimit - Itar*ESR}\left[1 - \sqrt{\frac{2L*Itar}{T(Vo+Vd-Vin)}}\right] \quad (24)$$

For the C computation, Vo is set to some value to provide a suitable operation for an expected range of the actual Vo voltages. In some embodiments, Vo=12 V.

In one embodiment the intensity of the LED emissions is varied to produce a dimming effect. Doing so by simply varying the current per duty cycle (e.g. reducing t1 in each duty cycle) might cause a color shift in white LEDs. In some embodiments of the present invention dimming is accomplished by the technique of cycle skipping (setting t1=0 for some cycles). The technique consists of driving less frequent pulses (t1>0), but any individual pulse event (i.e. any T cycle with t1>0) is at a current level Itar which will preserve the LED color. This has an additional advantage in that the FET 224 may be selected for best performance at Itar with a more uniform pulse width t1, thus preserving efficiency across a wide dynamic range of light intensity.

In some embodiments, controller 224 receives a signal identifying the cycle skipping number as the number of cycles to be skipped after each cycle with t1>0. In response, controller 274 enables and disables the driver 274 at a frequency determined by the cycle skipping number to provide the cycle skipping. Note also "TPS61060 TPS61061 TPS61062 CONSTANT CURRENT LED DRIVER WITH DIGITAL AND PWM BRIGHTNESS CONTROL" (Texas Instruments Incorporated, November 2004), incorporated herein by reference.

In some embodiments, the converter is controlled to provide a constant input power Pin rather than the constant output current Itar. The input power delivered in any cycle T is given by:

$$Pin = Vin*Iin \quad (25)$$

The LEDs drop more voltage when cold, less when hot, but the emission of light is a factor of the power applied. Also, the source (not shown) of voltage Vin may be able to provide more power with the rising temperature, so the input power regulation reduces the waste of the input energy. Moreover, some devices (e.g. cellular telephone radio transmitters) may have to operate in a power range restricted by law. Constant power control simplifies meeting the legal requirements.

In some embodiments, power is only delivered to the load during the time period t2. The power developed during t2 is equal to the power delivered during t1. Iin is given by equation (15). Neglecting Vd, we obtain:

$$Pin = \frac{d1^2 * T * Vin^2 * Vo}{2L(Vo - Vin)} \quad (26)$$

Here, Pin is the average power, i.e. Iin is the average current, equal to (Q1+Q2)/T. From equation (26), we obtain:

$$d1 = \frac{1}{Vin}\sqrt{\frac{2L*Pin*(Vo-Vin)}{T*Vo}} \quad (27A)$$

and $$t1 = d1*T = \frac{1}{Vin}\sqrt{\frac{2L*Pin*(Vo-Vin)*T}{Vo}} \quad (27B)$$

Controller 244 obtains the target power value Ptar (which is provided by the designer) and uses the equation (27B) with Pin=Ptar to calculate the time t1 for each cycle T from the sampled voltages Vin, Vo.

Alternatively, for each T cycle n, $d1=d1_{(n)}$ can be calculated from the ratio $d1_{(n)}/d1_{(n-1)}$ where $d1_{(n-1)}$ is the d1 value for the previous cycle. From equation (27A), $$d1_{(n)} = d1_{(n-1)} * \frac{Vin_{(n-1)}}{Vin_{(n)}}\sqrt{\frac{Vo_{(n-1)}}{Vo_{(n)}}}\sqrt{\frac{Vo_{(n)} - Vin_{(n)}}{Vo_{(n-1)} - Vin_{(n-1)}}} \quad (28)$$

where $Vin_{(i)}$, $Vo_{(i)}$ are the Vin and Vo values for the T cycle i for i=n−1, n. The same relationship holds for the t1 values $t1_{(i)}$ for the cycles i=n, n−1, i.e.:

$$tl_{(n)} = tl_{(n-1)} * \frac{Vin_{(n-1)}}{Vin_{(n)}} \sqrt{\frac{Vo_{(n-1)}}{Vo_{(n)}}} \sqrt{\frac{Vo_{(n)} - Vin_{(n)}}{Vo_{(n-1)} - Vin_{(n-1)}}} \quad (29)$$

Controller 244 uses this equation to calculate $t1_{(n)}$ from $t1_{(n-1)}$ for each cycle n (except the first one or more cycles of the constant power control operation, after the ramp up).

Figure 7:
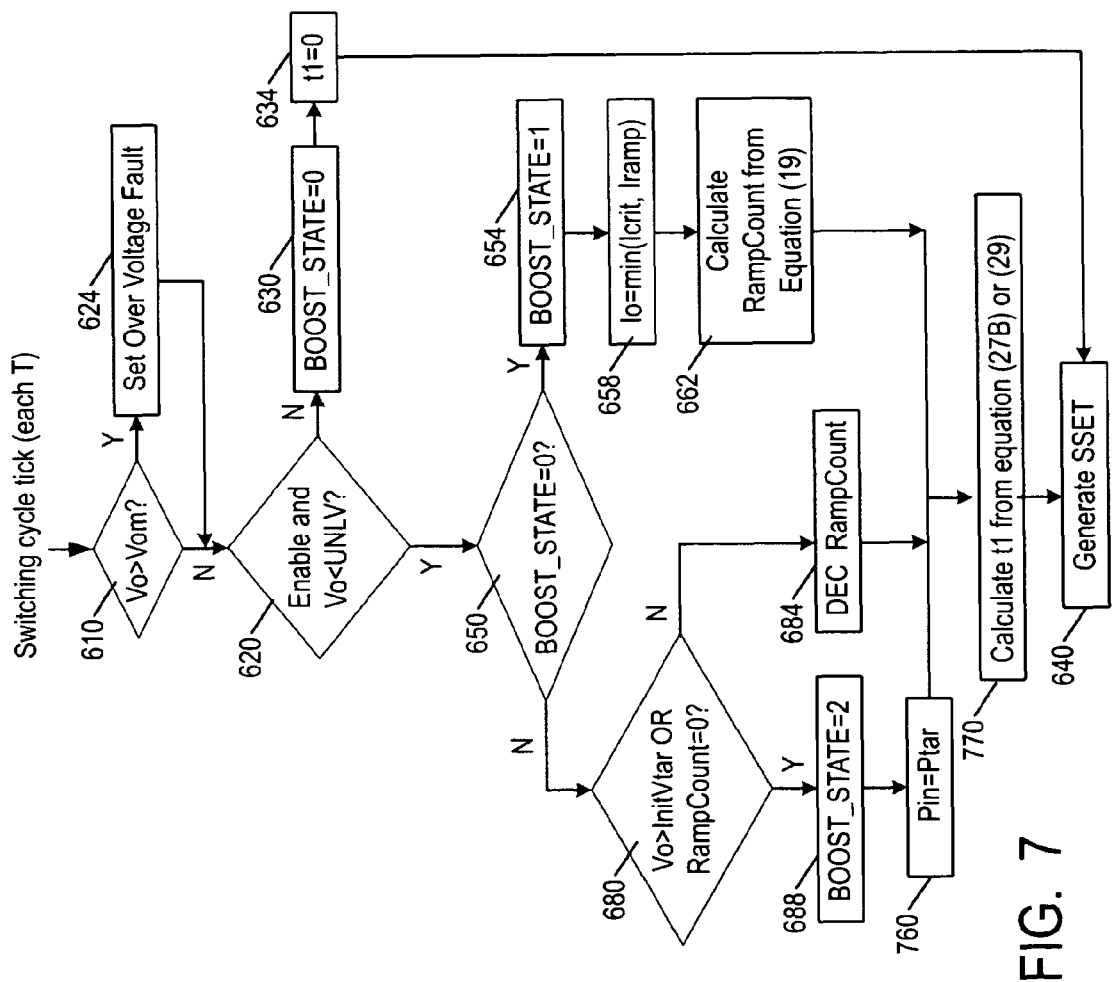

FIG. 7 shows a flowchart for one embodiment executed by controller 244. The flowchart is identical to that of FIG. 6, except that:
1. Step 692 is replaced with step 760, at which Pin is set to Ptar.
2. Step 670 (t1 calculation) is replaced with step 770, showing that t1 is calculated from equation (27B) or equation (29). Equation (29) can be used for any calculation after one or more T periods in which t1 was calculated with equation (27B).

The constant power control embodiments may use the cycle skipping techniques described above for the constant current control embodiments.

Some embodiments of FIGS. 6 and 7 omit the smoothing capacitor. This is done to provide a fast ramp up. In this case, C=0, so RampCount=0 (equation (19)), so the ramp up mode is used only for one T period (the T period for which BOOST_STATE is set to 1 at step 654 of FIG. 6 or 7). Other embodiments omit the ramp up altogether.

The invention is not limited to the embodiments described above. Processor 260 does not have to be a microprocessor (e.g. within a single integrated circuit). Also, processor 260 can be any computing circuit, e.g. an analog computer or some other computer. Processor 260 can include multiple processors. The processor instructions can be stored on a data carrier such as a writable computer memory or a read-only memory. The data carrier can also be a physical electromagnetic wave transmitted through space or over a cable. Other embodiments and variations are within the scope of the invention, as defined by the appended claims.

What is claimed is:

1. A method for controlling an average output current provided by a power converter on the converter's output terminal in a plurality of consecutive periods of time of an equal length T, wherein the average output current in any one of said periods of time is Q/T where Q is a charge provided to the output terminal said one of the periods of time, the method comprising, for at least one period of time:
(1) receiving, by a computing circuit, (i) an input-voltage-defining value which defines a sampled input voltage on the converter's input terminal, and (ii) an output-voltage-defining value which defines a sampled output voltage on the output terminal; and
(2) calculating by the computing circuit a pulse-width-defining value PW1 which defines a pulse width of a control signal in said at least one period of time, the pulse width controlling the average output current, wherein the value PW1 is calculated as a function of (i) the input-voltage-defining value, (ii) the output-voltage-defining value, and (iii) a target value for the average output current to be delivered to the output terminal in said at least one period of time;
wherein the converter is a boost converter;
wherein the value PW1 is calculated to represent the pulse width as directly proportional to (a) a square root of said target value, and (b) a square root of said length T.

2. The method of claim 1 wherein the value PW1 is not calculated as a function of any sampled values other than said sampled input voltage and said sampled output voltage.

3. A method for controlling an average input power provided by a power converter on the converter's input terminal in consecutive periods of time of an equal length T, the average input power being defined as a product of an input voltage on the input terminal multiplied by an average input current on the input terminal, wherein the average input current in any one of said periods of time is Q/T where Q is a charge provided to the input terminal in said one of said periods of time, the method comprising, for at least one period of time:
receiving, by a computing circuit, (i) an input-voltage-defining value which defines a sampled input voltage on the input terminal, and (ii) an output-voltage-defining value which defines a sampled output voltage on the converter's output terminal; and
calculating, by the computing circuit, a pulse-width-defining value PW1 which defines a pulse width of a control signal in said at least one period of time, the pulse width controlling the average input power, wherein the pulse-width-defining value PW1 is calculated as a function of:
(A) the input-voltage-defining value;
(B) the output-voltage-defining value; and
(C) at least one of:
(C1) a target value for the average input power to be provided to the input terminal in said at least one period of time;
(C2) a pulse-width-defining value PW1 for an earlier one of said periods of time which precedes said at least one of said periods of time, wherein the pulse-width-defining value PW1 for the earlier one of said periods of time was computed to provide said target value for the average input power in the earlier one of said periods of time.

4. The method of claim 3 wherein the value PW1 for said at least one of said periods of time is not calculated as a function of any sampled values other than said sampled input voltage and said sampled output voltage.

5. The method of claim 3 wherein the converter is a boost converter.

6. The method of claim 5 wherein the value PW1 for said at least one of said periods of time is calculated to represent the pulse width as directly proportional to (a) a square root of said target value, and (b) a square root of said length T.

7. A method for controlling an average output current or an average input power of a power converter in consecutive periods of time of an equal length T, the method comprising controlling the converter in a plurality of first periods of time and in one or more second periods of time preceding the first periods of time, the method comprising:
receiving, by a computing circuit, a first target value defining the average output current or the average input power for each of the first periods of time;
receiving, by the computing circuit, a second target value defining the average output current for each of the one or more second periods of time;
for each of the first and second periods of time, computing, by the computing circuit, a pulse-width-defining value PW1 which defines a pulse width of a control signal for each of the first and second periods of time, the pulse width controlling the average output current and/or the average input power for each of the first and second periods of time, wherein:
for each of the first periods of time, the pulse-width-defining value PW1 is computed to provide the first target value for the average output current or for the average input power; and for each of the second periods of time, the pulse-width-defining value PW1 is computed to provide the second target value for the average output current,
wherein computing the value PW1 comprises, for each of the first periods of time:
receiving, by the computing circuit, (i) an input-voltage-defining value which defines a sampled input voltage on an input terminal of the power converter, and (ii) an output-voltage-defining value which defines a sampled output voltage on an output terminal of the power computer; and
calculating, by the computing circuit, the pulse-width-defining value PW1 as a function of:
(A) the input-voltage-defining value;
(B) the output-voltage-defining value; and
(C) at least one of:
(C1) the first target value for the target average input power;
(C2) the pulse-width-defining value PW1 for another one of said first periods of time which precedes said at least one of said first periods of time.

8. The method of claim 7 wherein the first target value is a target value for the average output current, and the second target value is lower in magnitude than the first target value.

9. The method of claim 7 wherein computing the value PW1 comprises:
(1) receiving, by the computing circuit, (i) an input-voltage-defining value which defines a sampled input voltage on an input terminal of the power converter, and (ii) an output-voltage-defining value which defines a sampled output voltage on an output terminal of the power converter; and
(2) calculating by the computing circuit the pulse-width-defining value PW1 as a function of:
(i) the input-voltage-defining value;
(ii) the output-voltage-defining value; and
(iii) for each first period of time, of the first target value for the average output current, and for each second period of time, of the second target value.

* * * * *